US012271087B2

(12) United States Patent
Wang et al.

(10) Patent No.: US 12,271,087 B2
(45) Date of Patent: Apr. 8, 2025

(54) LIQUID CRYSTAL DISPLAY PANEL AND DISPLAY DEVICE

(71) Applicant: SHENZHEN CHINA STAR OPTOELECTRONICS SEMICONDUCTOR DISPLAY TECHNOLOGY CO., LTD, Shenzhen (CN)

(72) Inventors: He Wang, Shenzhen (CN); Guanshui Luo, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/519,944

(22) Filed: Nov. 27, 2023

(65) Prior Publication Data

US 2025/0060640 A1 Feb. 20, 2025

(30) Foreign Application Priority Data

Aug. 16, 2023 (CN) ........................ 202311041386.6

(51) Int. Cl.
*G02F 1/1339* (2006.01)
*G02F 1/1333* (2006.01)
(Continued)

(52) U.S. Cl.
CPC .. *G02F 1/136286* (2013.01); *G02F 1/133308* (2013.01); *G02F 1/133514* (2013.01); *G02F 1/1339* (2013.01); *G02F 2202/28* (2013.01)

(58) Field of Classification Search
CPC ......... G02F 1/136286; G02F 1/133308; G02F 1/133514; G02F 2202/28; G02F 1/0107;
(Continued)

(56) References Cited

U.S. PATENT DOCUMENTS

2001/0051398 A1* 12/2001 Hirakata ............. H01L 27/1214 438/149
2016/0147103 A1* 5/2016 Huang .................. G02F 1/1339 349/43
2021/0333587 A1* 10/2021 Zhang ................. G02F 1/13398

FOREIGN PATENT DOCUMENTS

CN 105242446 A * 1/2016
CN 107621721 A * 1/2018
JP H11237621 A * 8/1999

* cited by examiner

*Primary Examiner* — Hoan C Nguyen
(74) *Attorney, Agent, or Firm* — The Roy Gross Law Firm, LLC; Roy D. Gross

(57) ABSTRACT

A liquid crystal display panel and a display device are provided by the present disclosure. The liquid crystal display panel includes a first substrate, a second substrate, a liquid crystal layer, and a sealing structure. The sealing structure includes an inner retaining wall, an outer retaining wall, and a frame adhesive. The inner retaining wall is located in a frame area and surrounds a display area. The outer retaining wall surrounds the inner retaining wall and is disposed at intervals with the inner retaining wall. An accommodating space is provided between the outer retaining wall and the inner retaining wall. A bottom of the accommodating space is provided with a groove surrounding the inner retaining wall. The frame adhesive is located in the accommodating space.

20 Claims, 3 Drawing Sheets

(51) Int. Cl.
*G02F 1/1335* (2006.01)
*G02F 1/1362* (2006.01)

(58) Field of Classification Search
CPC ...... G02F 1/1339; G02F 1/161; G02F 1/1679; G02F 1/13452; G02F 1/13454; G02F 1/13306; G02F 1/0121; G02F 1/0123; G02F 1/0327; G02F 1/0516; G02F 1/0555; G02F 1/076; G02F 1/113; G02F 1/133
See application file for complete search history.

LIQUID CRYSTAL DISPLAY PANEL AND DISPLAY DEVICE

CROSS-REFERENCE TO RELATED APPLICATION

This application claims priority to and the benefit of Chinese Patent Application No. 202311041386.6, filed on Aug. 16, 2023, the disclosure of which is incorporated herein by reference in its entirety.

TECHNICAL FIELD

The present disclosure relates to display technologies, and in particular, to a liquid crystal display panel and a display device.

BACKGROUND

Gate driver on array (GOA) technology is a technology that manufacturing gate driving circuits on an array substrate to replace driving chips manufactured by external silicon chips. The GOA circuits may be disposed around a panel to reduce production processes, thereby realizing a narrow border design on a side where the GOA circuits are disposed and reducing production costs, so it has been widely used and studied. Display screens with larger size, higher resolution, and extremely narrow border (SNB) design have become a market trend to meet requirements of consumers, and splicing display screens inevitably require narrow and wide edges. However, as the resolution increases and a pixel size decreases, a GOA layout space increases accordingly. Therefore, how to realize a narrow border has become a problem that has to be solved.

The existing extremely narrow border liquid crystal display panel mainly reduces a width of the border by compressing a width of a frame adhesive, a width of a high-frequency clock signal bus area, a width of a gate driving circuit area, or by setting the frame adhesive in the high-frequency clock signal bus area. To ensure product characteristics, a compression space of the high-frequency clock signal bus area and the gate driving circuit area is small. Limited by material characteristics of the frame adhesive, a compression space is also small. Setting the frame adhesive in the high-frequency clock signal bus area is a mainstream solution adopted by the extremely narrow border liquid crystal display panel at present. However, a distance from the frame adhesive to an outer retaining wall needs to be compressed, which may make the frame adhesive overflow to an upper or outer side of the outer retaining wall, eater vapor may invade the liquid crystal display panel through an interface between the frame adhesive and the outer retaining wall, thereby increasing a risk of the water vapor invasion and resulting in a decline of a reliability of the liquid crystal display panel.

Therefore, it is necessary to provide a liquid crystal display panel and a display device to overcome this defect.

SUMMARY

A liquid crystal display panel and a display device are provided by the embodiments of the present disclosure to prevent external water vapor from invading an interior of the liquid crystal display panel, thereby improving the reliability of the liquid crystal display panel.

The embodiments of the present disclosure provide a liquid display panel including a display area and a frame area surrounding the display area. The liquid crystal display panel further includes a first substrate, a second substrate disposed opposite to the first substrate, a liquid crystal layer disposed between the first substrate and the second substrate, and a sealing structure disposed between the first substrate and the second substrate. The sealing structure is configured to seal the liquid crystal layer between the first substrate and the second substrate. The sealing structure includes an inner retaining wall, an outer retaining wall, and a frame adhesive. The inner retaining wall is located in the frame area and surrounds the display area. The outer retaining wall surrounds the inner retaining wall and is disposed at intervals with the inner retaining wall. An accommodating space is provided between the outer retaining wall and the inner retaining wall. A bottom of the accommodating space is provided with a groove surrounding the inner retaining wall. The frame adhesive is disposed in the accommodating space and fills the groove.

In some embodiments, the groove is disposed adjacent to the outer retaining wall.

In some embodiments, the frame area includes a circuit area and a non-circuit area disposed at a periphery of the circuit area. The inner retaining wall is disposed in the circuit area, the outer retaining wall is disposed in the non-circuit area, and the accommodating space is located in the circuit area and disposed adjacent to the non-circuit area.

In some embodiments, the circuit area includes a gate driving circuit area, a first signal wiring area, and a second signal wiring area. The gate driving circuit area includes a plurality of gate driving circuit units cascaded. The first signal wiring area is disposed at a periphery of the gate driving circuit area and for disposing a low-frequency clock signal wiring and a power supply low-voltage signal wiring. The second signal wiring area between the non-circuit area and the first signal wiring area and for disposing a high-frequency clock signal wiring. The inner retaining wall is located in the gate driving circuit area and disposed adjacent to the first signal wiring area, and the groove is located between the outer retaining wall and the second signal wiring area.

In some embodiments, the circuit area further includes a third signal wiring area between the non-circuit area and the second signal wiring area and for disposing a common electrode signal wiring. The outer retaining wall is located at a junction of the non-circuit area and the third signal wiring area, the first signal wiring area, the second signal wiring area, and the third signal wiring area are located in the accommodating space, and the groove is located in the third signal wiring area.

In some embodiments, the bottom of the accommodating space is provided with one groove; in a direction of the display area towards the non-circuit area, a width of the groove is less than or equal to a width of the third signal wiring area.

In some embodiments, the bottom of the accommodating space is provided with a plurality of grooves spaced at intervals and surrounding the inner retaining wall.

In some embodiments, the circuit area further includes a third signal wiring area where a common electrode signal wiring is disposed, and the third signal wiring area is between the non-circuit area and the second signal wiring area. A gap is provided between the outer retaining wall and the circuit area, the accommodating space crosses the first signal wiring area, the second signal wiring area, the third signal wiring area, and the non-circuit area, and the groove is located in the non-circuit area, or the third signal wiring area and the non-circuit area are located in the groove.

In some embodiments, the first substrate includes a circuit layer, a color filter layer disposed on the circuit layer, and an organic planarization layer disposed on the circuit layer and the color filter layer. Both the inner retaining wall and the outer retaining wall are disposed on the organic planarization layer, and the organic planarization layer is recessed to form the groove.

In some embodiments, both the inner retaining wall and the outer retaining wall are closed annular structures.

The present disclosure provides a display device including the liquid crystal display panel, the liquid display panel includes a display area and a frame area surrounding the display area. The liquid crystal display panel further includes a first substrate, a second substrate disposed opposite to the first substrate, a liquid crystal layer between the first substrate and the second substrate, and a sealing structure between the first substrate and the second substrate. The sealing structure is configured to seal the liquid crystal layer between the first substrate and the second substrate. The sealing structure includes an inner retaining wall, an outer retaining wall, and a frame adhesive. The inner retaining wall is located in the frame area and surrounds the display area. The outer retaining wall surrounds the inner retaining wall and is disposed at intervals with the inner retaining wall. An accommodating space is provided between the outer retaining wall and the inner retaining wall. A bottom of the accommodating space is provided with a groove surrounding the inner retaining wall. The frame adhesive is disposed in the accommodating space and fills the groove.

In some embodiments, the groove is disposed adjacent to the outer retaining wall.

In some embodiments, the frame area includes a circuit area and a non-circuit area disposed at a periphery of the circuit area. The inner retaining wall is disposed in the circuit area, the outer retaining wall is disposed in the non-circuit area, and the accommodating space is located in the circuit area and disposed adjacent to the non-circuit area.

In some embodiments, the circuit area includes a gate driving circuit area, a first signal wiring area, and a second signal wiring area. The gate driving circuit area includes a plurality of gate driving circuit units cascaded. The first signal wiring area disposed at a periphery of the gate driving circuit area and for disposing a low-frequency clock signal wiring and a power supply low-voltage signal wiring. The second signal wiring area between the non-circuit area and the first signal wiring area and for disposing a high-frequency clock signal wiring. The inner retaining wall is located in the gate driving circuit area and disposed adjacent to the first signal wiring area, and the groove is located between the outer retaining wall and the second signal wiring area.

In some embodiments, the circuit area further includes a third signal wiring area between the non-circuit area and the second signal wiring area, for disposing a common electrode signal wiring. The outer retaining wall is located at a junction of the non-circuit area and the third signal wiring area, the first signal wiring area, the second signal wiring area, and the third signal wiring area are located in the accommodating space, and the groove is located in the third signal wiring area.

In some embodiments, the bottom of the accommodating space is provided with one groove; in a direction of the display area towards the non-circuit area, a width of the groove is less than or equal to a width of the third signal wiring area.

In some embodiments, the bottom of the accommodating space is provided with a plurality of grooves spaced at intervals and surrounding the inner retaining wall.

In some embodiments, the circuit area further includes a third signal wiring area where a common electrode signal wiring is disposed, and the third signal wiring area is between the non-circuit area and the second signal wiring area. A gap is provided between the outer retaining wall and the circuit area, the first signal wiring area, the second signal wiring area, the third signal wiring area, and the non-circuit area are located in the accommodating space, and the groove is located in the non-circuit area, or the third signal wiring area and the non-circuit area are located in the groove.

In some embodiments, the first substrate includes a circuit layer, a color filter layer disposed on the circuit layer, and an organic planarization layer disposed on the circuit layer and the color filter layer. Both the inner retaining wall and the outer retaining wall are disposed on the organic planarization layer, and the organic planarization layer is recessed to form the groove.

In some embodiments, both the inner retaining wall and the outer retaining wall are closed annular structures.

Beneficial effects of the embodiments of the present disclosure are that: The embodiments of the present disclosure provide the liquid crystal display panel and the display device. The liquid crystal display panel includes the display area and the frame area surrounding the display area. The display panel further includes the first substrate, the second substrate, the liquid crystal layer, and the sealing structure. The sealing structure is used to seal the liquid crystal layer between the first substrate and the second substrate. The sealing structure includes the inner retaining wall, the outer retaining wall, and the frame adhesive. The inner retaining wall is located in the frame area and surrounds the display area. The outer retaining wall surrounds the inner retaining wall and is spaced at intervals with the inner retaining wall. The accommodating space is provided between the outer retaining wall and the inner retaining wall. The bottom of the accommodating space is provided with the groove surrounding the inner retaining wall. The frame adhesive is disposed in the accommodating space and fills the groove. The first substrate and the second substrate are bonded by the frame adhesive of the sealing structure. Before the first substrate and second substrate are cell-assembled, the frame adhesive is located in the accommodating space but does not fill the groove. When the first substrate and second substrate are cell-assembled, the frame adhesive may be compressed by the first substrate and second substrate. The frame adhesive compressed may preferentially flow into the groove to prevent the frame adhesive from overflowing an upper or outer side of the outer retaining wall, thereby reducing the risk of water vapor intrusion and improving the reliability of the liquid crystal display panel.

DETAILED DESCRIPTION

The following description of every embodiment with reference to the accompanying drawings is used to exemplify a specific embodiment which may be carried out in the present disclosure. Directional terms mentioned in the present disclosure, such as "top", "bottom", "front", "back", "left", "right", "inside", "outside", "side" etc., are only used with reference to orientations of the accompanying drawings. Therefore, the used directional terms are intended to illustrate, but not to limit, the present disclosure. In the accompanying drawings, units with similar structures are indicated by a same number.

The present disclosure is further explained below with reference to the accompanying drawings and specific embodiments.

The present disclosure provides a liquid crystal display panel to prevent external water vapor from invading an interior of the liquid crystal display panel and improve the reliability of the liquid crystal display panel.

Figure 1:
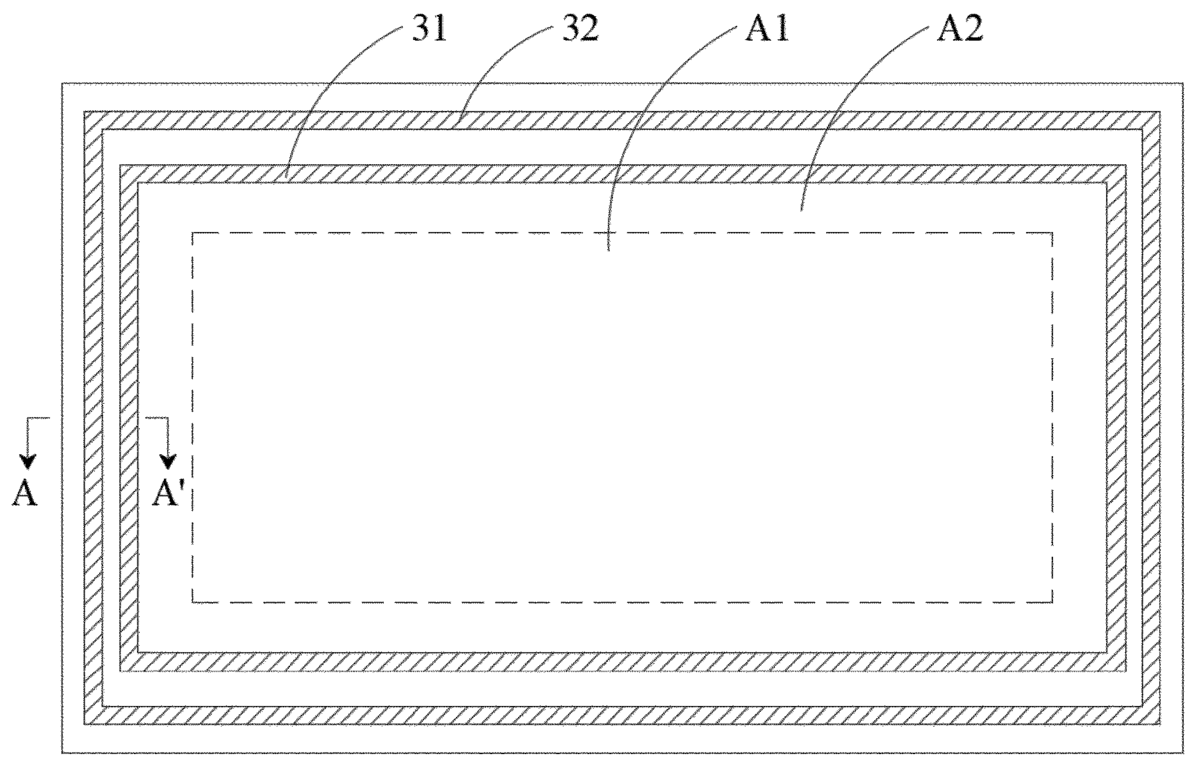
FIG. 1 is a plan schematic diagram of a liquid crystal display panel provided by an embodiment of the present disclosure.

Referring to FIG. 1, FIG. 1 is a plan schematic diagram of a liquid crystal display panel provided by an embodiment of the present disclosure. The liquid crystal display panel includes a display area A1 and a frame area A2 surrounding the display area A1. In FIG. 1, an area within a dotted line is defined as the display area A1, and an area outside the dotted line is defined as the frame area A2. The display area A1 is an area where images may be displayed, and the frame area A2 is an area where the images may not be displayed.

Figure 2:
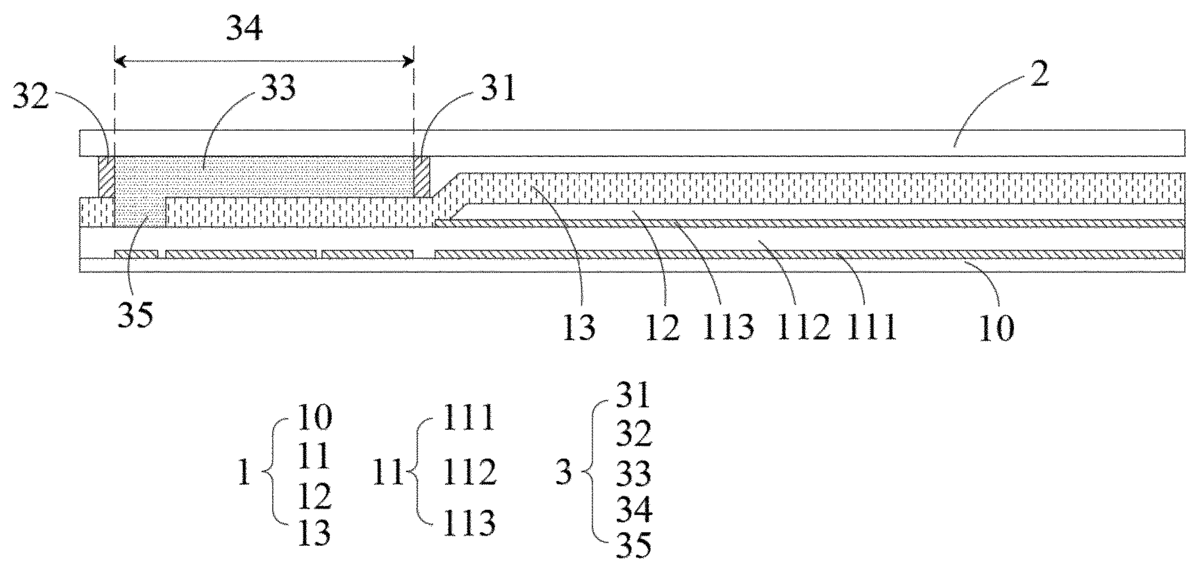
FIG. 2 is a cross-sectional diagram of the liquid crystal display panel provided by a first embodiment shown in FIG. 1 in an A-A' direction.

Referring to FIG. 2, FIG. 2 is a cross-sectional diagram of the liquid crystal display panel provided by a first embodiment shown in FIG. 1 in an A-A' direction. The liquid crystal display panel includes a first substrate 1, a second substrate 2, a liquid crystal layer, and a sealing structure 3. The second substrate 2 is disposed opposite to the first substrate 1. The liquid crystal layer is disposed between the first substrate 1 and the second substrate 2. The sealing structure 3 is disposed between the first substrate 1 and the second substrate 2 and used for sealing the liquid crystal layer between the first substrate 1 and the second substrate 2. It should be noted that FIG. 2 is a cross-sectional diagram of the frame area of the liquid crystal display panel, so the liquid crystal layer is not illustrated.

Referring to FIG. 1 and FIG. 2, the sealing structure 3 includes an inner retaining wall 31, an outer retaining wall 32, and a frame adhesive 33. The inner retaining wall 31 is located in the frame area A2. The outer retaining wall 32 surrounds the inner retaining wall 31 and is disposed at intervals with the inner retaining wall 31. An accommodating space 34 for placing the frame adhesive 33 is provided between the outer retaining wall 32 and the inner retaining wall 31. A bottom of the accommodating space 34 is provided with a groove 35 surrounding the inner retaining wall 31.

In this embodiment of the present disclosure, as shown in FIG. 1, in a top view, both the inner retaining Wall 31 and the outer retaining Wall 32 are closed annular structures. The inner retaining Wall 31 completely surrounds the display area A1, and the outer retaining Wall 32 is disposed on a periphery of the inner retaining Wall 31 and completely surrounds the inner retaining Wall 31, so that the liquid crystal layer may be completely sealed between the first substrate 1 and the second substrate 2. The groove 35 is a closed annular structure and completely surrounds the inner retaining wall 31.

In one embodiment, the first substrate 1 is an array substrate, and the second substrate 2 is a substrate opposite to the first substrate 1. Before the first substrate 1 and the second substrate 2 are cell-assembled, the outer retaining wall 32 and the inner retaining wall 31 are firstly formed on the first substrate 1. The frame adhesive 33 is disposed in the accommodating space 34 between the outer retaining wall 32 and the inner retaining wall 31, but does not fill the accommodating space 34. That is, gaps are formed between the frame adhesive 33 and the outer retaining wall 32, and between the frame adhesive 33 and the inner retaining wall 31. The groove 35 is not filled with frame adhesive 33. When the first substrate 1 and the second substrate 2 are cell-assembled, the frame adhesive 33 flows in a direction towards the outer retaining wall 32 and the inner retaining wall 31 under the compression of the first substrate 1 and the second substrate 2, and fills the gaps between the frame adhesive 33 and the outer retaining wall 32, and between the frame adhesive 33 and the inner retaining wall 31. Since the bottom of the accommodating space 34 is provided with the groove 35 disposed adjacent to the outer retaining wall 32, a terrain difference at the outer retaining wall 32 may be increased. When the frame adhesive 33 may preferentially into the groove 35 when flowing towards the outer retaining wall 32 to prevent the frame adhesive 33 from overflowing to an upper or outer side of the outer retaining wall 32, thereby reducing a risk of water vapor invasion and improving the reliability of the liquid crystal display panel.

It should be noted that the groove 35 is disposed adjacent to the outer retaining wall 32. A distance from the groove 35 to the outer retaining wall 32 is greater than a distance from the groove 35 to the inner retaining wall 31, which ensures that the frame adhesive 33 flowing towards the outer retaining wall 32 may flow preferentially into the groove 35 to prevent the frame adhesive 33 from overflowing to an upper or outer side of the outer retaining wall 32.

In one embodiment, the groove 35 may be disposed against the outer retaining wall 32. That is, the groove 35 is located inside the outer retaining wall 32, and a distance from the display area A1 to the frame area A2 is 0 in a direction of the display area A1 towards the frame area A2. In other embodiments, the grooves 35 and the outer retaining wall 32 may further be spaced at intervals, and the distance from the groove 35 to the outer retaining wall 32 may be greater than the distance from the groove 35 to the inner retaining wall 31.

As shown in FIG. 2, the liquid crystal display panel provided by this embodiment of the present disclosure is a color filter on an array (COA) type liquid crystal display panel. The first substrate 1 includes a substrate 10, a circuit layer 11 disposed on the substrate 10, a color filter layer 12, and an organic planarization layer 13. The circuit layer 11 may include but is not limited to a first metal layer 111, an insulating layer 112, and a second metal layer 113. The color filter layer 12 is disposed on the circuit layer 11 and includes color resists with a plurality of colors, such as red resist, green resist, and blue resist. The organic planarization layer 13 is disposed on the circuit layer 11 and the color filter layer 12, and may be an organic polymer film material having low dielectric properties, good leveling properties, and good air permeability. Both the inner retaining wall 31 and the outer retaining wall 32 are disposed on the organic planarization layer 13. The organic planarization layer 13 is recessed to form the groove 35.

In one embodiment, as shown in FIG. 2, the groove 35 goes through the organic planarization layer 13, and the bottom of the groove 35 is exposed with the insulating layer 112. In other embodiments, the groove 35 may be recessed into the organic planar layer 13 but not go through the organic planarization layer 13. Or, the groove 35 goes through the organic planarization layer 13 and the insulating layer 112 located below the organic planarization layer 13. In any structure mentioned above, the groove 35 may be used to accommodate the overflow of the frame adhesive 33, which is beneficial to reduce the risk of overflow of the frame adhesive 33, which is beneficial to reduce the risk of overflow of the frame adhesive 33.

In the embodiment of the present disclosure, the circuit layer 11 includes a plurality of thin film transistors. A type of the thin film transistors may be amorphous silicon thin film transistors or metal oxide semiconductor thin film transistors. A material of the metal oxide may be selected from any one of indium gallium zinc oxide (IGZO), indium gallium zinc tin oxide (IGZTO), indium zinc oxide (IZO), and zinc tin oxide (ZINC).

In some embodiments, the frame area A2 includes a circuit area A21 and a non-circuit area A22 disposed at a periphery of the circuit area A21. The inner retaining wall 31 is disposed in the circuit area A21. The outer retaining wall is at least disposed in the non-circuit area A22. The accommodating space 34 is at least located in the circuit area A21 and disposed adjacent to the non-circuit area A22. Under this structure, by shrinking the inner retaining wall 31 to the circuit area A21, the accommodating space 34 may be located at least in circuit area A21, so that the frame adhesive 33 may be coated in the circuit area A21, and the first substrate 1 and the second substrate 2 are sealed and bonded by using the space in the circuit area A21, thereby preventing the frame adhesive 33 from occupying a larger width of the frame area A2, further reducing a width of the frame of the liquid crystal display panel on a basis of reducing the risk of overflow of the frame adhesive 33, and realizing an effect of ultra-narrow frame.

Figure 3:
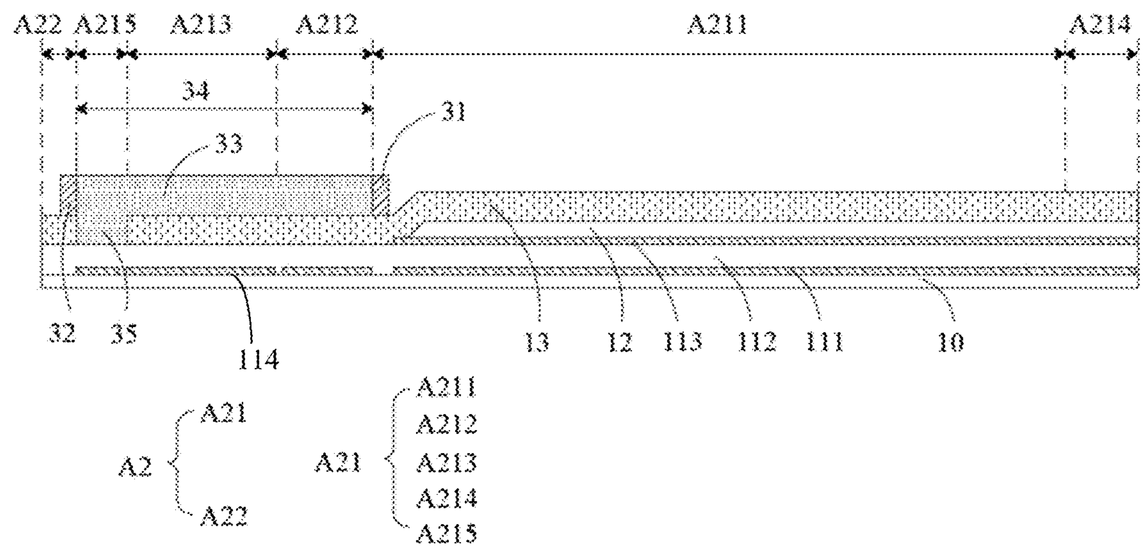
FIG. 3 is a schematic diagram of a film structure of a first substrate provided by the first embodiment of the present disclosure.

Referring to FIG. 3, FIG. 3 is a schematic diagram of a film structure of a first substrate provided by the first embodiment of the present disclosure. The circuit area A21 includes a gate driving circuit area A211, a first signal wiring area A212, and a second signal wiring area A213. The gate driving circuit area A211 includes a plurality of gate driving circuit units cascaded. The first signal wiring area A212 is disposed at a periphery of the gate driving circuit area A211, and is used for disposing a low-frequency clock signal wiring and a power supply low-voltage signal wiring. The low-frequency clock signal wiring is used for transmitting a low-frequency clock signal, and the power supply low-voltage signal wiring is used for transmitting a power supply low-voltage signal. The second signal wiring area A213 is disposed between the non-circuit area A22 and the first signal wiring area A212. The second signal wiring area A213 is used for disposing a high-frequency clock signal 114 wiring which is used for transmitting a high-frequency clock signal.

The circuit area A21 further includes a fourth signal wiring area A214 located at a side of the array substrate. The fourth signal wiring area A214 is disposed between the gate driving circuit area A211 and the display area A1. The fourth signal wiring area A214 is used for disposing a common electrode signal wiring located at the side of the array substrate, which is used for transmitting a common electrode signal of the array substrate.

As shown in FIG. 3, the inner retaining wall 31 is located in the gate driving circuit area A211 and disposed adjacent to the first signal wiring area A212. The outer retaining wall 32 is located in the non-circuit area A22. The groove 35 is located between the outer retaining wall 32 and the second signal wiring area A213.

In some embodiments, the circuit area A21 further includes a third signal wiring area A215 for disposing a common electrode signal wiring for transmitting a common voltage signal required by a common electrode on the second substrate 2. The third signal wiring area A215 is disposed between the non-circuit area A22 and the second signal wiring area A213.

As shown in FIG. 3, the third signal wiring area A215 is located between the non-circuit area A22 and the second signal wiring area A213, and is disposed adjacent to the non-circuit area A22 and the second signal wiring area A213. The outer retaining wall 32 is located at a junction of the non-circuit area A22 and the third signal wiring area A215. The inner retaining wall 31 is located at a junction of the gate driving circuit area A211 and the first signal wiring area A212. the first signal wiring area A212, the second signal wiring area A213, and the third signal wiring area A215 are located in the accommodating space 34. The groove 35 is located in the third signal wiring area A215.

In one embodiment, as shown in FIG. 3, the bottom of the accommodating space 34 is provided with one groove 35 located in the third signal wiring area A215 and adjacent to the outer retaining wall 32. That is, in the direction of the display area A1 towards the non-circuit area A22, there is no gap between the groove 35 and the outer retaining wall 32. In the direction of the display area A1 towards the non-circuit area A22, a width of the groove 35 is equal to a width of the third signal wiring area A215. That is, the bottom of a part of the accommodation space 34 located in the third signal wiring area A215 is provided with the groove 35.

In other embodiments, in the direction of the display area A1 towards the non-circuit area A22, the width of the groove 35 may also be less than the width of the third signal wiring area A215, which also reduces the risk of overflow of the frame adhesive 33.

In some embodiments, the bottom of the accommodating space 34 is provided with a plurality of grooves 35 spaced at intervals and surrounding the inner retaining wall 31.

Figure 4:
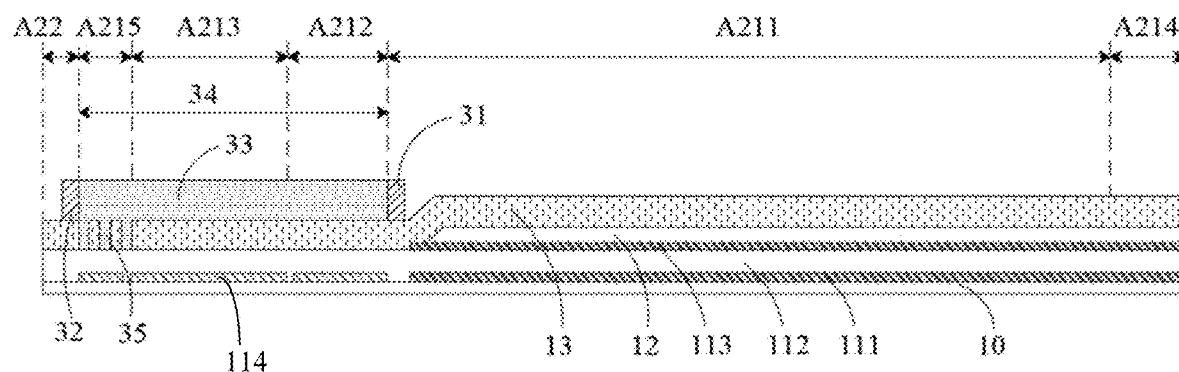
FIG. 4 is a schematic diagram of a film structure of a first substrate provided by a second embodiment of the present disclosure.

As shown in FIG. 4, FIG. 4 is a schematic diagram of a film structure of a first substrate provided by a second embodiment of the present disclosure. The structure shown in FIG. 4 is roughly the same as the structure of the first substrate shown in FIG. 3, except that the bottom of the accommodating space 34 is provided with three grooves 35 arranged at intervals in the direction of the display area A1 towards the non-circuit area A22 and all surrounding the inner retaining wall 31.

Referring to FIG. 1 and FIG. 4, in the top view of FIG. 1, the three grooves 35, like the inner retaining wall 31 and the outer retaining wall 32, are all enclosed circular structures. The three grooves 35 completely surround the inner retaining wall 31, and are spaced apart from each other.

In practical applications, the number of the grooves 35 at the bottom of the accommodating space 34 may be set according to actual situations, not limited to one or three in the embodiments mentioned above, but also may be two, four, or more. Since the grooves 35 are formed by exposure with the organic planarization layer 13, when the distance between the outer retaining wall 32 and the second signal wiring area is too large (more than 200 microns), there may be a risk that the grooves 35 may not be formed by exposure. By providing the plurality of grooves 35 at the bottom of the accommodation space 34, it is ensured that the grooves 35 may be formed by exposure at the bottom of the accommodation space 34.

Figure 5:
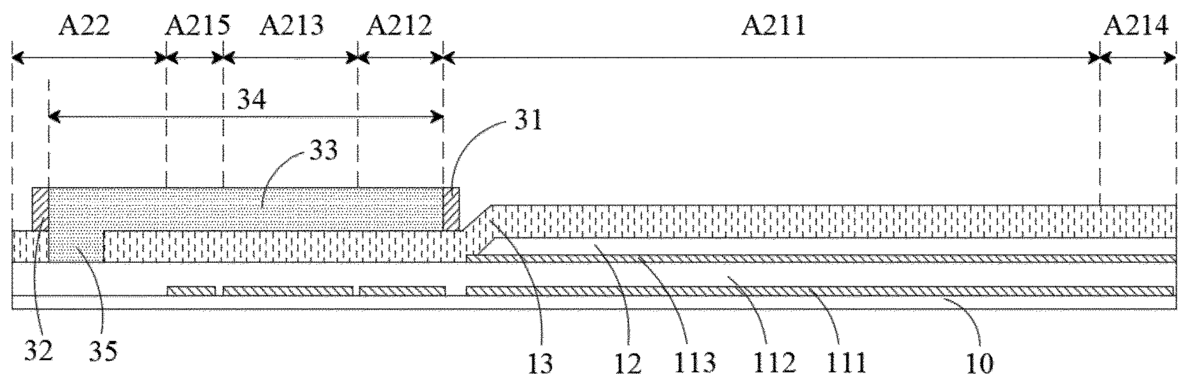
FIG. 5 is a schematic diagram of a film structure of a first substrate provided by a third embodiment of the present disclosure.

In one embodiment, as shown in FIG. 5, FIG. 5 is a schematic diagram of a film structure of a first substrate provided by a third embodiment of the present disclosure. The structure shown in FIG. 5 is roughly the same as the structure of the first substrate shown in FIG. 3, except that a gap is provided between the outer retaining wall 32 and the circuit area A21, the first signal wiring area A212, the second signal wiring area A213, the third signal wiring area A215, and the non-circuit area A22 are located in the accommodating space 34, and the groove 35 is located in the non-circuit area A22.

Specifically, the outer retaining wall 32 is located in the non-circuit area A22 and has a certain gap with the circuit area A21. The inner retaining wall 31 is located at the junction of the gate driving circuit area A211 and the first signal wiring area A212. A space between the outer retaining wall 32 and the inner retaining wall 31 is the accommodation space 34. That is, the first signal wiring area A212, the second signal wiring area A213, the common electrode signal wiring area A215, and the non-circuit area A22 are located in the accommodating space 34. The groove 35 is located in the non-circuit area A22 and is disposed adjacent to the inside of the outer retaining wall 32. Under this structure, an area space of the frame adhesive may be increased by increasing the width of the accommodating space 34, thereby reducing the risk of overflow of the frame adhesive 33.

Figure 6:
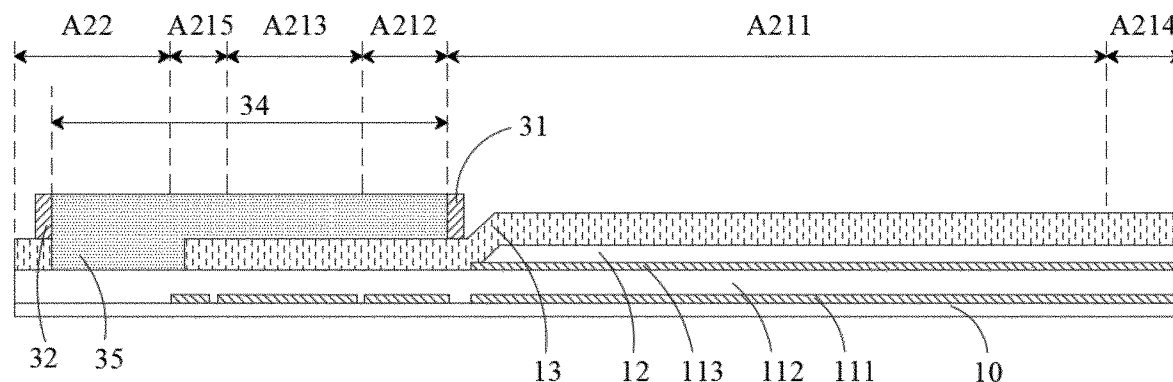
FIG. 6 is a schematic diagram of a film structure of a first substrate provided by a fourth embodiment of the present disclosure.

In one embodiment, as shown in FIG. 6, FIG. 6 is a schematic diagram of a film structure of a first substrate provided by a fourth embodiment of the present disclosure. The structure shown in FIG. 6 is roughly the same as the structure of the first substrate shown in FIG. 5, except that the fourth signal wiring area A214 and the non-circuit area A22 are located in the groove 35.

Specifically, the outer retaining wall 32 is located in the non-circuit area A22 and has the certain gap with the circuit area A21. The inner retaining wall 31 is located at the junction of the gate driving circuit area A211 and the first signal wiring area A212. The space between the outer retaining wall 32 and the inner retaining wall 31 is the accommodation space 34. That is, the first signal wiring area A212, the second signal wiring area A213, the common electrode signal wiring area A215, and the non-circuit area A22 are located in the accommodation space 34. The third signal wiring area A215 and the non-circuit area A22 are located in the groove 35. Under this structure, by increasing the width of the groove 35, not only a capacity of the groove 35 may be increased, so that the groove 35 may accommodate more frame adhesive 33, but also the terrain section difference at the outer retaining wall 32 may be further increased, thereby further reducing the risk of overflow of the frame adhesive 33.

According to the liquid crystal display panel provided by the embodiments of the present disclosure, the embodiments of the present disclosure further provide a display device including the liquid crystal display panel provided by any embodiment mentioned above. The display device may be, but is not limited to, a smartphone, a smartwatch, a desktop computer, a notebook computer, a television, and the like.

Beneficial effects of the embodiments of the present disclosure are as follows: The embodiments of the present disclosure provide the liquid crystal display panel and the display device. The liquid crystal display panel includes the display area and the frame area surrounding the display area. The display panel further includes the first substrate, the second substrate, the liquid crystal layer, and the sealing structure. The sealing structure is used to seal the liquid crystal layer between the first substrate and the second substrate. The sealing structure includes the inner retaining wall, the outer retaining wall, and the frame adhesive. The inner retaining wall is located in the frame area and surrounds the display area. The outer retaining wall surrounds the inner retaining wall and is spaced at intervals with the inner retaining wall. The accommodating space is provided between the outer retaining wall and the inner retaining wall. The bottom of the accommodating space is provided with the groove surrounding the inner retaining wall. The frame adhesive is disposed in the accommodating space and fills the groove. The first substrate and the second substrate are bonded by the frame adhesive of the sealing structure. Before the first substrate and second substrate are cell-assembled, the frame adhesive is located in the accommodating space but does not fill the groove. When the first substrate and second substrate are cell-assembled, the frame adhesive may be compressed by the first substrate and second substrate. The frame adhesive compressed may preferentially flow into the groove to prevent the frame adhesive from overflowing an upper or outer side of the outer retaining wall, thereby reducing the risk of water vapor intrusion and improving the reliability of the liquid crystal display panel.

In summary, although the present disclosure has been disclosed as above with preferred embodiments, the above preferred embodiments are not intended to limit the present invention. Those of ordinary skill in the art can make various changes and retouching without departing from the spirit and scope of the present disclosure. Therefore, a protection scope of the present disclosure is subject to a scope defined by the claims.

What is claimed is:

1. A liquid crystal display panel, comprising a display area and a frame area surrounding the display area, and further comprising:

a first substrate;

a second substrate, disposed opposite to the first substrate;

a liquid crystal layer, disposed between the first substrate and the second substrate; and a sealing structure, disposed between the first substrate and the second substrate, and configured to seal the liquid crystal layer between the first substrate and the second substrate, wherein the sealing structure comprises:

an inner retaining wall, located in the frame area and surrounding the display area;

an outer retaining wall, surrounding the inner retaining wall and disposed at intervals with the inner retaining wall, wherein an accommodating space is provided between the outer retaining wall and the inner retaining wall, and a bottom of the accommodating space is provided with a groove surrounding the inner retaining wall; and a frame adhesive, disposed in the accommodating space and filling the groove;

wherein the first substrate comprises:

a circuit layer;

a color filter layer, disposed on the circuit layer; and an organic planarization layer, disposed on the circuit layer and the color filter layer, wherein both the inner retaining wall and the outer retaining wall are disposed on the organic planarization layer, and the organic planarization layer is recessed to form the groove.

2. The liquid crystal display panel according to claim 1, wherein the groove is disposed adjacent to the outer retaining wall.

3. The liquid crystal display panel according to claim 1, wherein the frame area comprises a circuit area and a non-circuit area disposed at a periphery of the circuit area; the inner retaining wall is disposed in the circuit area, the outer retaining wall is disposed in the non-circuit area, and the accommodating space is located in the circuit area and disposed adjacent to the non-circuit area.

4. The liquid crystal display panel according to claim 3, wherein the circuit area comprises:

a gate driving circuit area;

a first signal wiring area, disposed at a periphery of the gate driving circuit area; and a second signal wiring area, between the non-circuit area and the first signal wiring area, for disposing a high-frequency clock signal wiring;

wherein the inner retaining wall is located in the gate driving circuit area and disposed adjacent to the first signal wiring area, and the groove is located between the outer retaining wall and the second signal wiring area.

5. The liquid crystal display panel according to claim 4, wherein the circuit area further comprises a third signal wiring area between the non-circuit area and the second signal wiring area, for disposing a common electrode signal wiring;

the outer retaining wall is located at a junction of the non-circuit area and the third signal wiring area, the first signal wiring area, the second signal wiring area, and the third signal wiring area are located in the accommodating space, and the groove is located in the third signal wiring area.

6. The liquid crystal display panel according to claim 5, wherein the bottom of the accommodating space is provided with one groove; in a direction of the display area towards the non-circuit area, a width of the groove is less than or equal to a width of the third signal wiring area.

7. The liquid crystal display panel according to claim 5, wherein the bottom of the accommodating space is provided with a plurality of grooves spaced at intervals and surrounding the inner retaining wall.

8. The liquid crystal display panel according to claim 4, wherein the circuit area further comprises a third signal wiring area where a common electrode signal wiring is disposed, and the third signal wiring area is between the non-circuit area and the second signal wiring area;

a gap is provided between the outer retaining wall and the circuit area, the accommodating space crosses the first signal wiring area, the second signal wiring area, the third signal wiring area, and the non-circuit area, and the groove is located in the non-circuit area, or the third signal wiring area and the non-circuit area are located in the groove.

9. The liquid crystal display panel according to claim 1, wherein both the inner retaining wall and the outer retaining wall are closed annular structures.

10. A display device, comprising a liquid crystal display panel comprising a display area and a frame area surrounding the display area, wherein the liquid crystal display panel further comprises:

a first substrate;

a second substrate, disposed opposite to the first substrate;

a liquid crystal layer, disposed between the first substrate and the second substrate; and a sealing structure, disposed between the first substrate and the second substrate, and configured to seal the liquid crystal layer between the first substrate and the second substrate, wherein the sealing structure comprises:

an inner retaining wall, located in the frame area and surrounding the display area;

an outer retaining wall, surrounding the inner retaining wall and disposed at intervals with the inner retaining wall, wherein an accommodating space is provided between the outer retaining wall and the inner retaining wall, and a bottom of the accommodating space is provided with a groove surrounding the inner retaining wall; and a frame adhesive, disposed in the accommodating space and filling the groove;

wherein the first substrate comprises:

a circuit layer;

a color filter layer, disposed on the circuit layer; and an organic planarization layer, disposed on the circuit layer and the color filter layer, wherein both the inner retaining wall and the outer retaining wall are disposed on the organic planarization layer, and the organic planarization layer is recessed to form the groove.

11. The display device according to claim 10, wherein the groove is disposed adjacent to the outer retaining wall.

12. The display device according to claim 10, wherein the frame area comprises a circuit area and a non-circuit area disposed at a periphery of the circuit area; the inner retaining wall is disposed in the circuit area, the outer retaining wall is disposed in the non-circuit area, and the accommodating space is located in the circuit area and disposed adjacent to the non-circuit area.

13. The display device according to claim 12, wherein the circuit area comprises:

a gate driving circuit area;

a first signal wiring area, disposed at a periphery of the gate driving circuit area; and a second signal wiring area, between the non-circuit area and the first signal wiring area, for disposing a high-frequency clock signal wiring;

wherein the inner retaining wall is located in the gate driving circuit area and disposed adjacent to the first signal wiring area, and the groove is located between the outer retaining wall and the second signal wiring area.

14. The display device according to claim 13, wherein the circuit area further comprises a third signal wiring area between the non-circuit area and the second signal wiring area, for disposing a common electrode signal wiring;

the outer retaining wall is located at a junction of the non-circuit area and the third signal wiring area, the first signal wiring area, the second signal wiring area, and the third signal wiring area are located in the accommodating space, and the groove is located in the third signal wiring area.

15. The display device according to claim 14, wherein the bottom of the accommodating space is provided with one groove; in a direction of the display area towards the non-circuit area, a width of the groove is less than or equal to a width of the third signal wiring area.

16. The display device according to claim 14, wherein the bottom of the accommodating space is provided with a plurality of grooves spaced at intervals and surrounding the inner retaining wall.

17. The display device according to claim 13, wherein the circuit area further comprises a third signal wiring area where a common electrode signal wiring is disposed, and the third signal wiring area is between the non-circuit area and the second signal wiring area;

a gap is provided between the outer retaining wall and the circuit area, the first signal wiring area, the second signal wiring area, the third signal wiring area, and the non-circuit area are located in the accommodating space, and the groove is located in the non-circuit area, or the third signal wiring area and the non-circuit area are located in the groove.

18. The display device according to claim 10, wherein both the inner retaining wall and the outer retaining wall are closed annular structures.

19. A liquid crystal display panel, comprising a display area and a frame area surrounding the display area, and further comprising:

a first substrate;

a second substrate, disposed opposite to the first substrate;

a liquid crystal layer, disposed between the first substrate and the second substrate; and a sealing structure, disposed between the first substrate and the second substrate, and configured to seal the liquid crystal layer between the first substrate and the second substrate, wherein the sealing structure comprises:

an inner retaining wall, located in the frame area and surrounding the display area;

an outer retaining wall, surrounding the inner retaining wall and disposed at intervals with the inner retaining wall, wherein an accommodating space is provided between the outer retaining wall and the inner retaining wall, and a bottom of the accommodating space is provided with a groove surrounding the inner retaining wall; and a frame adhesive, disposed in the accommodating space and filling the groove;

wherein the frame area comprises a circuit area and a non-circuit area disposed at a periphery of the circuit area; the inner retaining wall is disposed in the circuit area, the outer retaining wall is disposed in the non-circuit area, and the accommodating space is located in the circuit area and disposed adjacent to the non-circuit area; and wherein the circuit area comprises:

a gate driving circuit area;

a first signal wiring area, disposed at a periphery of the gate driving circuit area; and a second signal wiring area, between the non-circuit area and the first signal wiring area, for disposing a high-frequency clock signal wiring;

wherein the inner retaining wall is located in the gate driving circuit area and disposed adjacent to the first signal wiring area, and the groove is located between the outer retaining wall and the second signal wiring area.

20. The liquid crystal display panel according to claim 19, wherein the circuit area further comprises a third signal wiring area between the non-circuit area and the second signal wiring area, for disposing a common electrode signal wiring;

the outer retaining wall is located at a junction of the non-circuit area and the third signal wiring area, the first signal wiring area, the second signal wiring area, and the third signal wiring area are located in the accommodating space, and the groove is located in the third signal wiring area.

* * * * *